United States Patent
Carmel

(10) Patent No.: US 8,874,138 B2
(45) Date of Patent: Oct. 28, 2014

(54) SYSTEMS AND METHODS FOR DETERMINING TO USE GEO-FENCING BY USING STRAIGHT-LINE DISTANCES BETWEEN LOCATIONS

(71) Applicant: Guy Carmel, Rehovot (IS)

(72) Inventor: Guy Carmel, Rehovot (IS)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/839,456

(22) Filed: Mar. 15, 2013

(65) Prior Publication Data

US 2014/0274117 A1 Sep. 18, 2014

(51) Int. Cl.
| | | |
|---|---|---|
| *H04W 24/00* | (2009.01) | |
| *H04W 4/00* | (2009.01) | |
| *H04M 11/00* | (2006.01) | |
| *H04W 4/02* | (2009.01) | |

(52) U.S. Cl.
CPC .................................. *H04W 4/021* (2013.01)
USPC .................. 455/456.1; 455/456.3; 455/456.5; 455/456.6; 455/457; 455/421; 455/422.1

(58) Field of Classification Search
USPC ............................ 455/421, 422.1, 456.1–457
See application file for complete search history.

(56) References Cited

U.S. PATENT DOCUMENTS

| 6,532,672 | B1 | 3/2003 | Gottlieb | |
|---|---|---|---|---|
| 8,406,783 | B2 * | 3/2013 | Eitan et al. | 455/456.1 |
| 2002/0183077 | A1 * | 12/2002 | Fomukong | 455/456 |
| 2005/0209921 | A1 | 9/2005 | Roberts et al. | |
| 2007/0149219 | A1 | 6/2007 | Lee et al. | |
| 2010/0127919 | A1 | 5/2010 | Curran et al. | |

FOREIGN PATENT DOCUMENTS

WO 2007/095251 A2 8/2007

OTHER PUBLICATIONS

International Search Report and Written Opinion received for PCT Patent Application No. PCT/US2014/028487, mailed on Jul. 11, 2014, 18 pages.

* cited by examiner

*Primary Examiner* — Marisol Figueroa
(74) *Attorney, Agent, or Firm* — Sutherland Asbill & Brennan

(57) ABSTRACT

Systems and methods are described herein for determining whether a user device is within a geofenced region using lower powered location tracking techniques. In one instance, the user device may determine the minimum distances to geofenced regions. The user device may track the distance between locations and compare those distances to the minimum distances to determine the likelihood the user device is within one of the geofenced regions.

23 Claims, 6 Drawing Sheets

SYSTEMS AND METHODS FOR DETERMINING TO USE GEO-FENCING BY USING STRAIGHT-LINE DISTANCES BETWEEN LOCATIONS

TECHNICAL FIELD

The embodiments described herein generally relate to location determination systems and methods that may determine the likelihood of a user device being within a geographic boundary.

BACKGROUND

A variety of location detection techniques or services are available for a variety of user devices. The location services may use different techniques or hardware to determine the location of a user device. Geographic or location boundaries may be established to provide information to user devices that are located within the boundaries. However, the user device may consume an undesirable amount of power and computing resources repeatedly attempting to determine whether the user device is located within the boundaries.

BRIEF DESCRIPTION OF THE FIGURES

The features within the drawings are numbered and are cross-referenced with the written description. Generally, the first numeral reflects the drawing number where the feature was first introduced, and the remaining numerals are intended to distinguish the feature from the other notated features within that drawing. However, if a feature is used across several drawings, the number used to identify the feature in the drawing where the feature first appeared will be used. Reference will now be made to the accompanying drawings, which are not necessarily drawn to scale and wherein.

DETAILED OF EMBODIMENTS

Figure 1:
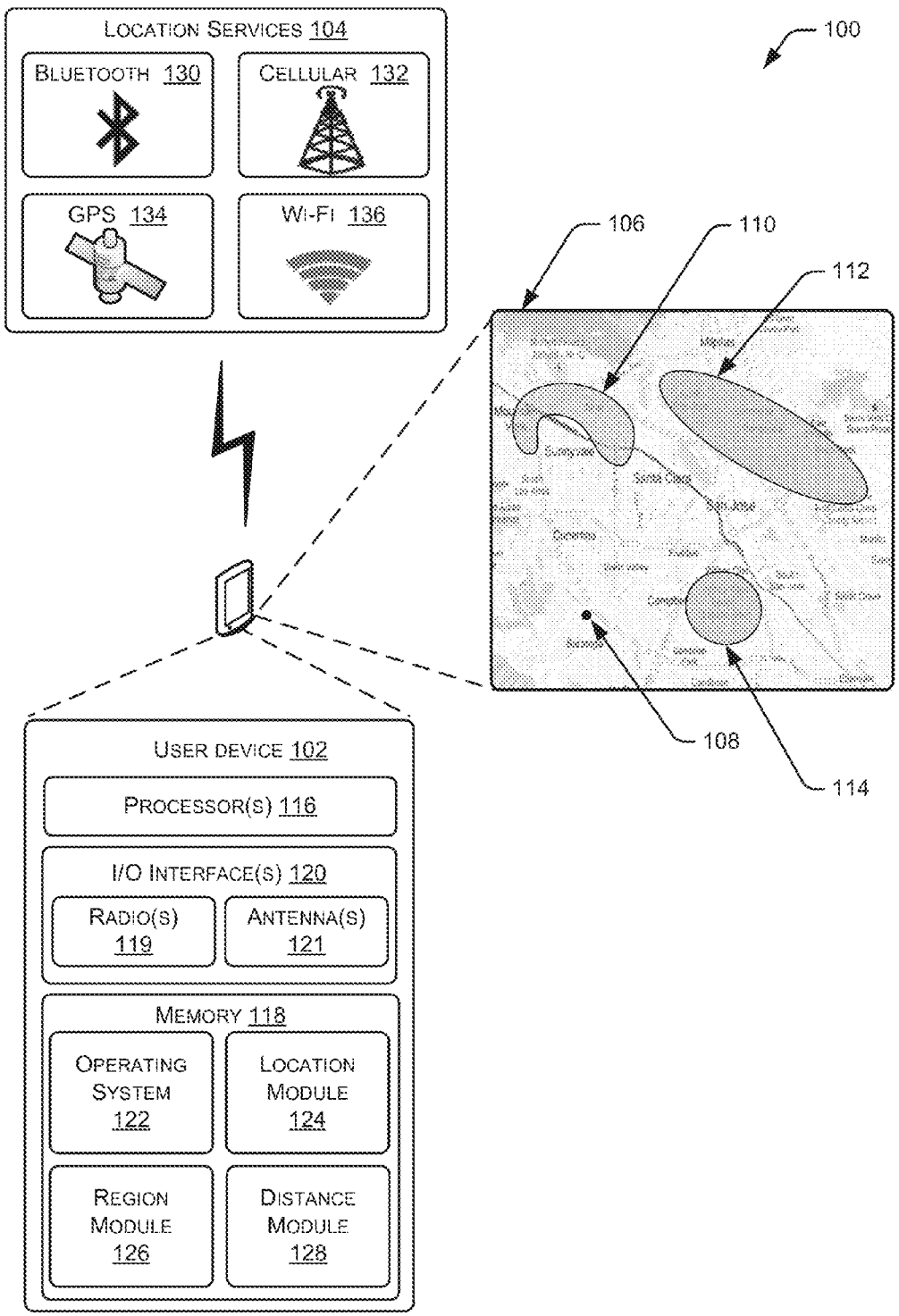
FIG. 1 illustrates a system that includes the user device that interacts with location services to determine the distances between the different locations of the user device in accordance with one or more embodiments of the disclosure.

Embodiments of the disclosure are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

This disclosure may describe systems, methods, and devices for determining when a user device may be within one or more regions defined by respective geographic boundaries. The user device may receive or provide information to or from a remote device when the user device is within the one or more geographic boundaries. However, when the user device is mobile, the user device may repeatedly determine the location of the user device with respect to the geographic boundaries. Mobile user devices may have limited power and computing resources that may be drained or over utilized when repeatedly determining whether the user device is within the geographic boundaries. It may be advantageous to reduce the amount of power consumption or computing resources to determine whether the user device in within one of the geographic boundaries.

The user device may reduce power or resource consumption by simplifying the complexity of the location determination of the user device. For example, the user device may use a method that tracks the horizontal distance changes in the user device's location and compares the changes to a simplified geographic boundary model to conserve power and computing resources.

In one embodiment, the user device may determine the location of the geographic boundaries for the regions in which the user device may receive region specific information. The geographic boundaries may be of any shape or size and may include portions of the region that are closer to the user device than other portions of the same region. The user device location may also be determined relative to the geographic boundaries. The user device may then determine a minimum distance to one or more geographic boundaries. In one instance, the minimum distance may include the straight line distance to the boundary. In this way, the minimum distance may not include the most navigable or passable route between the user device and the geographic boundary. In fact, the minimum distance may be a horizontal straight line distance that may independent of the elevation differences between the user device location the closest portions of the geographic boundary. In this way, the minimum distance provides a simple metric that may be more efficiently determined than a more complex two-dimensional or three-dimensional location calculation. A minimum distance may be determined for each of the one or more geographic boundaries that may be within travelling distance by the user via walking, riding, and/or driving.

In this embodiment, the user device may move from a first location to a second location. The user device may determine a gap distance between the first location and the second location. In one instance, the gap distance may be a straight line distance between the first location and the second location of the user device. The straight line distance may include the absolute horizontal distance that may not include an elevation component. Again, the straight line distance may not reflect the actual path travelled by the user device between the first and second location. The user device may compare the gap distance with the one or more minimum distances.

In one embodiment, the user device may compare the gap distance the minimum distances to determine the likelihood that the user device is within one of the geographic boundaries. For example, when the difference between the gap distance and one or more of the minimum distances is less than or equal to zero there is a strong likelihood that the user device is within that geographic boundary. In this case, the user device may implement additional location determinations of the user device and the geographic boundary to confirm the user device is within the geographic boundary. The confirmation process may use additional power and processing resources of the user device. Alternatively, the user device may attempt to query a remote device that manages information related to the geographic boundary. In certain instances, the communication ability of the remote device may be distance limited. If the user device is not within the communication range of the remote device, the user device may not be within the geographic boundary. In this case, the previously mentioned additional location determinations may be omitted when the communication confirmation occurs.

In another embodiment, the minimum distances may be determined based on the nearest coordinate point associated with the geographic boundary. For example, the nearest coordinate point may include a location that is located at the center of the geographic boundary. In this instance, the minimum distance may be the distance between the user device location and the center point. However, in other embodiments, the coordinate point may located along the perimeter of the geographic boundary that may not be the absolute minimum distance between the geographic boundary and the user device. For example, the coordinate point may indicate, for example, the furthest point of the geographic boundary in the north, south, west, or east. In other embodiments, the furthest point of the geographic boundary may also be selected in other directions besides absolute north, south, west, or east. Any point along the perimeter of the geographic boundary may be used as the coordinate point. Accordingly, the minimum distance between the location of the user device and the coordinate may be determined by or provided to the user device.

Example embodiments of the disclosure will now be described with reference to the accompanying figures.

Illustrative System

FIG. 1 illustrates a system 100 that may include a user device 102 that may use locations services 104 to generate a map 106 that includes a location 108 of the user device 102 and geographic regions (e.g., region 110, region 112, and region 114). When the user device 102 is within one of the geographic regions (e.g., region 110, region 112, and region 114) the user device 102 may receive information related to the geographic region (e.g., region 110). However, maintaining constant location awareness may consume an undesirable amount of power or resources of the user device 102. Broadly, the user device 102 may use the location services 104 to determine the minimum distances between the user device 102 and the geographic regions (e.g., region 110, region 112, and region 114). The user device 102 may minimize power and/or resource consumption by simplifying the location requirements to determine when the user device 102 is within one of the geographic regions (e.g., region 110, region 112, and region 114).

In one embodiment, the user device 102 may track changes in distance and compare them to the minimum distance to determine the likelihood that the user device 102 is within a geographic region (e.g., region 110). The changes in distance may be tracked in absolute terms that may not rely on changes in direction or changes in elevation. Hence, power consumption may be reduced by minimizing the complexity of the user device 102 location determination. Minimizing power consumption for a user device 102 that operates on a limited power supply may be advantageous.

The user device 104 may include, but is not limited to, smartphones, mobile phones, laptop computers, desktop computers, tablet computers, televisions, set-top boxes, game consoles, in-vehicle computer systems, and so forth. The user device 104 may include, but is not limited to, one or more processors 116, memory 118, and/or input/output (I/O) interfaces 120.

The processor 116 may execute computer-readable instructions stored in the memory 118 that enable the device to execute instructions on the hardware, applications, or services associated with the user device 102. The one or more processors 116 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. In certain embodiments, the processor 116 may be based on an Intel® architecture system, and the processor(s) 116 and chipset may be from a family of Intel® processors and chipsets, such as the Intel® Atom® processor family. The one or more processors 116 may also include one or more application-specific integrated circuits (ASICs) or application-specific standard products (ASSPs) for handling specific data processing functions or tasks.

The user device 102 may also include an input/output (I/O) interface 120 that enables a user to view content displayed by the device or to interact with the user device 102 using various tactile responsive interfaces such as a keyboard, a touch screen, or a mouse. The I/O interface 120 may also include a wireless system that may enable the user device 102 to communicate wirelessly with the location service 104. In certain embodiments, the wireless system may include one or more radios 119 and one or more antennas 121. The radio(s) 119 may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. One or more of the radios 119 also may be capable of operating in other operating frequencies and according to various wireless protocols, for example, Bluetooth™, cellular, and/or GPS.

The memory 118 may include an operating system 120 to manage and execute applications stored therein as well as other systems and modules within the user device 102. The memory 118 may be comprised of one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or combinations thereof. The memory 118 may include, but is not limited to, a location module 124, a region module 126, and a distance module 128.

The location module 124 may collect location information from the location services 104 to determine the location of the user device 102 and to track the changes in location of the user device 102. The location module 124 may receive location information that may be collected by the wireless systems of the I/O interfaces. The location information may be received from a variety of location services 104 that may include, but are not limited to, personal area networks 130 (e.g., Bluetooth™), cellular networks 132, GPS networks 134, and/or Wi-Fi networks 136. The location services will be discussed below in the description of FIG. 1. Broadly, the location services may provide location information from multiple sources that may be used to determine the location of the user device 102. For example, the concept of triangulation may be used when three or more sources of a location service 104 may be used to calculate the location of the user device. In one instance, the location information may include the known location information that may be used to determine the location of the user device 102. In one embodiment, the location information may be used to determine the latitude, longitude, and elevation of the user device 102. The location 108 may be determined using the above techniques to provide an accurate location of the user device 102.

In one embodiment, the user device 102 may use the relatively complex location determination each time to confirm the user device 102 is within the geographic region (e.g., region 110). However, the power consumed using this technique may be prohibitive to maintaining battery life. Additional techniques will be discussed in the discussion of the region module 128 below. But first, the user device 102 may determine the location of the geographic regions (e.g., region 110, region 112, and region 114).

The region module 126 may receive information that may define the geographic boundaries of the geographic region (e.g., region 110, region 112, and region 114). The information may be received from network server (not shown) or another remote device (not shown) for the geographic region (e.g., region 110). The location information may indicate a single point location with a radius that may cover the geographic region (e.g., region 114). For example, region 114 may include a coordinate point at the center of the circle and may indicate a radius around that point that covers the effective region of region 114. The effective region being the area in which the user device 102 may receive or send information related to the region. The information or regional information may include, but is not limited to, traffic, advertising, safety, and/or directions to a location within the region. The traffic information may indicate traffic congestion or other traffic conditions or availability (e.g., high occupancy vehicle lanes). The information may also include advertising for nearby retailers or restaurants that may attempt to draw customers who are nearby the stores. Safety information may warn the user of nearby hazards in a building or warehouse that may require the use of personal protective equipment. The safety information may also warn users when a fire or leak has occurred nearby in the building or warehouse.

In another embodiment, the region 114 may provide coordinate information for the perimeter of the circle. The coordinate information may include two or more coordinate points that may indicate the perimeter of the region 114. For example, the circle for region 114 may include four or more points spread across the circumference of the circle. When the user device 102 is located within the region 114 defined by the coordinate points, the user device 102 may receive information associated with the region 114. In this way, the geographic boundary information may provide a threshold that when crossed may enable the user device 102 to receive information associated with the region. As the number of coordinate points increase, the resolution of the geographic boundary may become better defined and may more clearly define the area of the region 114.

In another embodiment, the region 112 may include an elliptical region that may be defined by four or more coordinate points. In one embodiment, the elliptical region 112 may include four coordinate points on the perimeter of the region 112 where the curvature of the ellipse is either maximized or minimized along the major and minor axes. In this instance, the oblong ends of the region 112 may include two coordinate points at each end along the major axis. The remaining two points may be along the minor axis that is perpendicular to the major axis. Additional coordinate points may be assigned to the perimeter of the region 112 using the foci of the ellipse that are two points within the region 112 on the major axis and that are equidistant from the center of the region.

In another embodiment, the region 110 may include a free form region that, as a whole, may not conform to an easily recognizable shape. However, the region 110 may be subdivided into smaller recognizable shapes like, but not limited to, a circle, square, triangle, and/or an ellipse to assign coordinates along the perimeter of the region 110. In another instance, the coordinates may be assigned based on known coordinates of latitude and longitude. Hence, the reliance on a mathematical assignment of the coordinates from a central location(s) may not be required. The free form coordinates may be determined using mapping software that may define the coordinates based on regions that are drawn on a map or that receive instructions on where the region 110 should cover by listing addresses or known locations for the scope of the region 110. They coordinates may also be assigned by selecting a known location such as one or more buildings, a neighborhood, a residential sub-division, a school, a work site, a tourist area, a shopping area, a recreation area, and/or a place of residence. In these examples, the coordinates may already be known or may be determined by the mapping software stored in the region module 126 or generated by a remote device or network server that provide the information to the user device 102.

When the regions 110, 112, 114 are defined the user device 102 may execute computer-executable instructions to determine the minimum distance between the location 108 of the user device 102 and the nearest portion of each of the regions. In another embodiment, the portion may include the nearest known coordinate of the regions 110, 112, 114. The nearest known coordinate may located on the perimeter of the region 110 or located within the perimeter of the region 110.

The distance module 128 may determine the minimum distance to the one or more regions 110, 112, 114 and track the distance of the user device 102 travels between locations over time. The minimum distance determination may include measuring distance in absolute values that are independent of the direction of the vector from the user device 102 at its initial location 108 to the nearest coordinate point of the regions 110, 112, 114. In one embodiment, the minimum distance is the straight line distance between the initial location 108 and the regions 110, 112, 114. The straight line distance may be the horizontal distance between the initial location 108 and the regions 110, 112, 114 and may not include the elevation differences between the initial location 108 and the regions 110, 112, 114. The minimum distance may be stored in memory 118 recalled when the user device 102 moves from the initial location 108.

When the user device 102 moves to a second location (not shown), the distance module 128 may determine the gap distance between the initial location 108 and the second location. The gap distance may include the absolute value of a straight line distance between the initial location 108 and the second location. In this instance, the gap distance may include the horizontal distance between the initial location 108 and the second location, which may not include the distance associated with changes in elevation between the initial location 108 and the second location.

The distance module 128 may determine the user device 102 has a strong likelihood of being within one of the regions 110, 112, 114 when the difference between the gap distance and the minimum distances are less than or equal to zero. In this instance, the region module 128 may direct the location module 124 to determine an accurate location of the user device 102 to confirm the user device 102 is within one of the regions. However, when the difference between the gap distance and the minimum distances are greater than zero the user device 102 has a lower likelihood of being within one of the regions 110, 112, 114. In this case, the distance module 128 may update the minimum distances by subtracting the gap distance from the prior minimum distances to generate an updated minimum distance. The updated minimum distance may provide an indication of the minimum distance from the user device 102 to the one or more regions 110, 112, 114. The updated minimum distance may independent of the orientation or direction of the gap distance vector. Hence, the magnitude of the gap distance vector is of primary concern regarding in the updated minimum distance calculation.

The region module 128 may use the updated minimum distance when the user device moves from the second location to a third location. Another gap distance may be determined between the second and third locations. The new gap distance may be compared to the updated minimum distance to determine the likelihood of whether the user device 102 is within one or more of the regions 110, 112, 114. For example, when the difference between the new gap distance and the updated minimum distances is less than or equal to zero, the user device has a strong likelihood of being within one of the regions 110, 112, 114. When the difference may be greater than zero, the user device 102 may be less likely to be within one or more of the regions 110, 112, 114. In this instance, the updated minimum distances may be updated again using the new gap difference. In this way, the above method may be repeated with the user device 102 moves from the third location to a fourth location and so on.

The location services 104 may include, but are not limited to, a global positioning system (GPS) network 134 (e.g., a satellite network), a Wi-Fi network 136 (e.g., an access point network), a cellular network 132, or a Bluetooth network 130 (e.g., a personal area network). More broadly, the location services 104 may pertain to any system or device that may provide any type of signal or information that may be used, either by itself or in conjunction with other information or signals, to enable the user device 104 to determine its location.

The global positioning system 134 may include any satellite-based system that may be used to provide location information to the user device 102. The satellite network (not shown) may include one or more satellites that transmit signals towards the surface of the earth. The signals may include the location of the satellite or the relative position of the satellite to the earth and a time of transmission from the satellite. The user device 102 may receive one or more of the transmissions from one or more satellites. The location and timing information may be used to determine the location of the user device 102.

The satellite network may include a global service availability based on the satellites that are orbiting the earth on a continuous basis. The location accuracy of the satellite network service may be within a few meters between the determined location and the real location of the user device 102.

The Wi-Fi network 136 may include access points (not shown) that send wireless signals to the user device 102. The Wi-Fi network 136 may include one or more access points that may be at a known location(s). The access point may send wireless signals that may include location information of the access point and the time that the transmission was sent. The user device 102 may use that information to determine its location. In another embodiment, the user device 102 may send a signal to one or more access points that may use that information to determine the location of the user device 102 relative to the access points. The location determination may include triangulation techniques that may include three or more access points. However, in certain instances, fewer access points may be available, which may result in the location accuracy being lower. In contrast, when larger amounts of access points are triangulating the location, the location accuracy may be higher.

The cellular network 132 may include several radio transceivers distributed over a geographic area that provides voice and data communications for mobile devices (e.g., user device 102). Generally, depending upon the geography, the transceivers may be several kilometers apart. The transceivers may provide overlapping service areas to provide consistent communications service over the geographic area. In certain instances, the transceivers may be used to determine the location of the user device 102 based, at least in part, on receiving signals from the user device 102. In this way, the location of the user device 102 may be determined, but the location accuracy may be low. For example, when only one transceiver detects the user device 102, the location accuracy may be as large as the service area of the transceiver. The service area may be several square kilometers. In another instance, when several transceivers detect the signal from the user device 102, the location accuracy may be improved to within several meters. The information received at or from the transceivers may be used to triangulate the location of the user device 102.

The Bluetooth network 130 (e.g., a personal area network) may include wireless devices that may transmit and receive signals over a short distance (e.g., 10 meters). Typically, the Bluetooth devices may be tethered on networks with another device that may have a larger transmission range or that may be coupled to a network via a landline connection. Bluetooth devices that may be coupled to a fixed landline may be a known location. When the user device 102 is within the broadcast range of the Bluetooth device, the location accuracy may be 10 meters. However, when the user device 102 may be in communication with several Bluetooth devices, the location accuracy may improve based on the triangulation techniques described above. In one embodiment, the Bluetooth device may be tethered to another mobile device; hence, the location accuracy of the Bluetooth network 130 may be dependent on whether the mobile device (not shown) is enabled to determine its location or knows its own location through other means. In this instance, the Bluetooth network 130 may be dependent upon another network (e.g., a cellular network) to determine the location of the user device 102.

Illustrative Methods

Figure 2A:
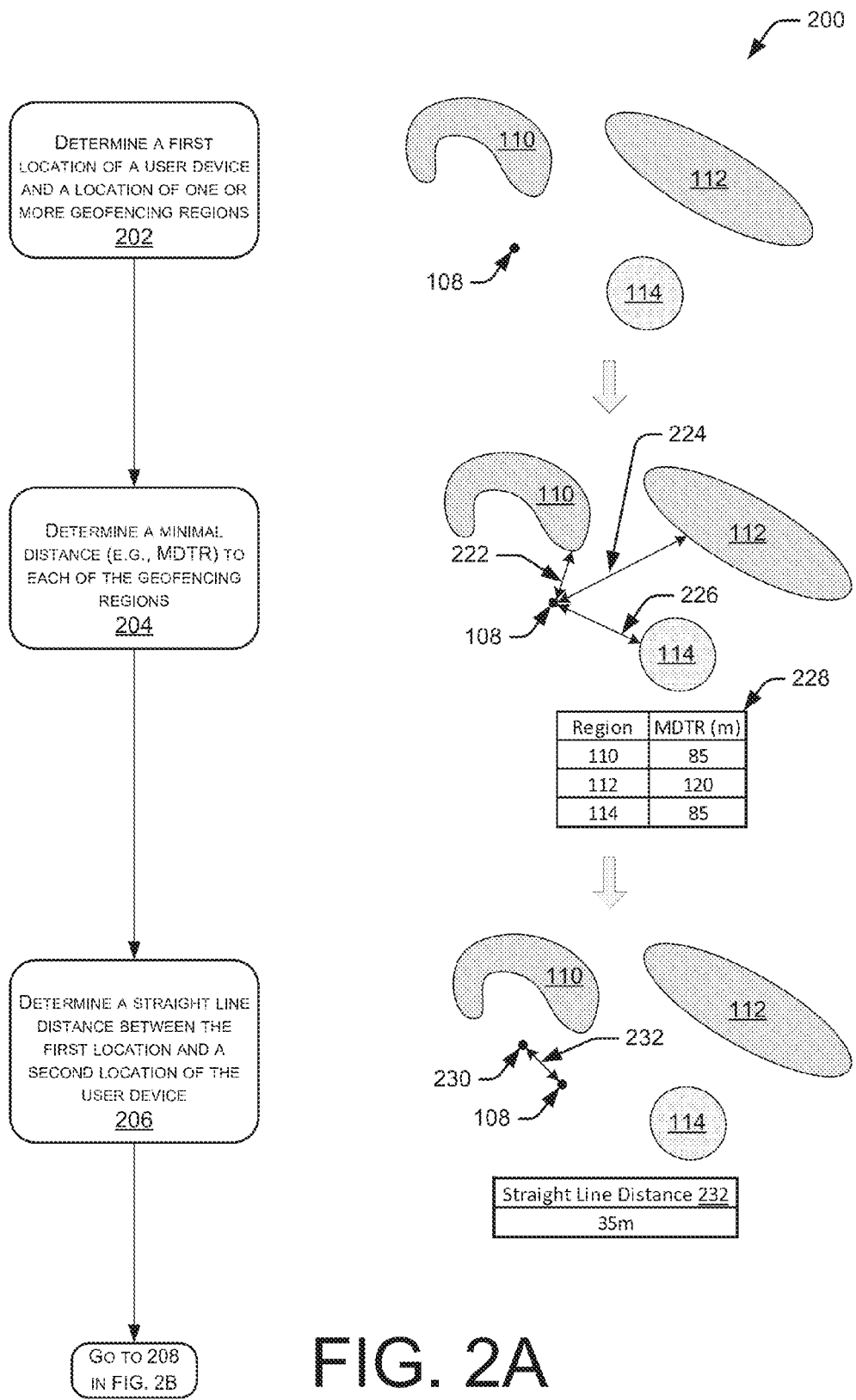
FIGS. 2A-2C illustrates a flow diagram with accompanying illustrations of a method for determining the likelihood that the user device is within a geographic region in accordance with one or more embodiments of the disclosure.
Figure 2B:
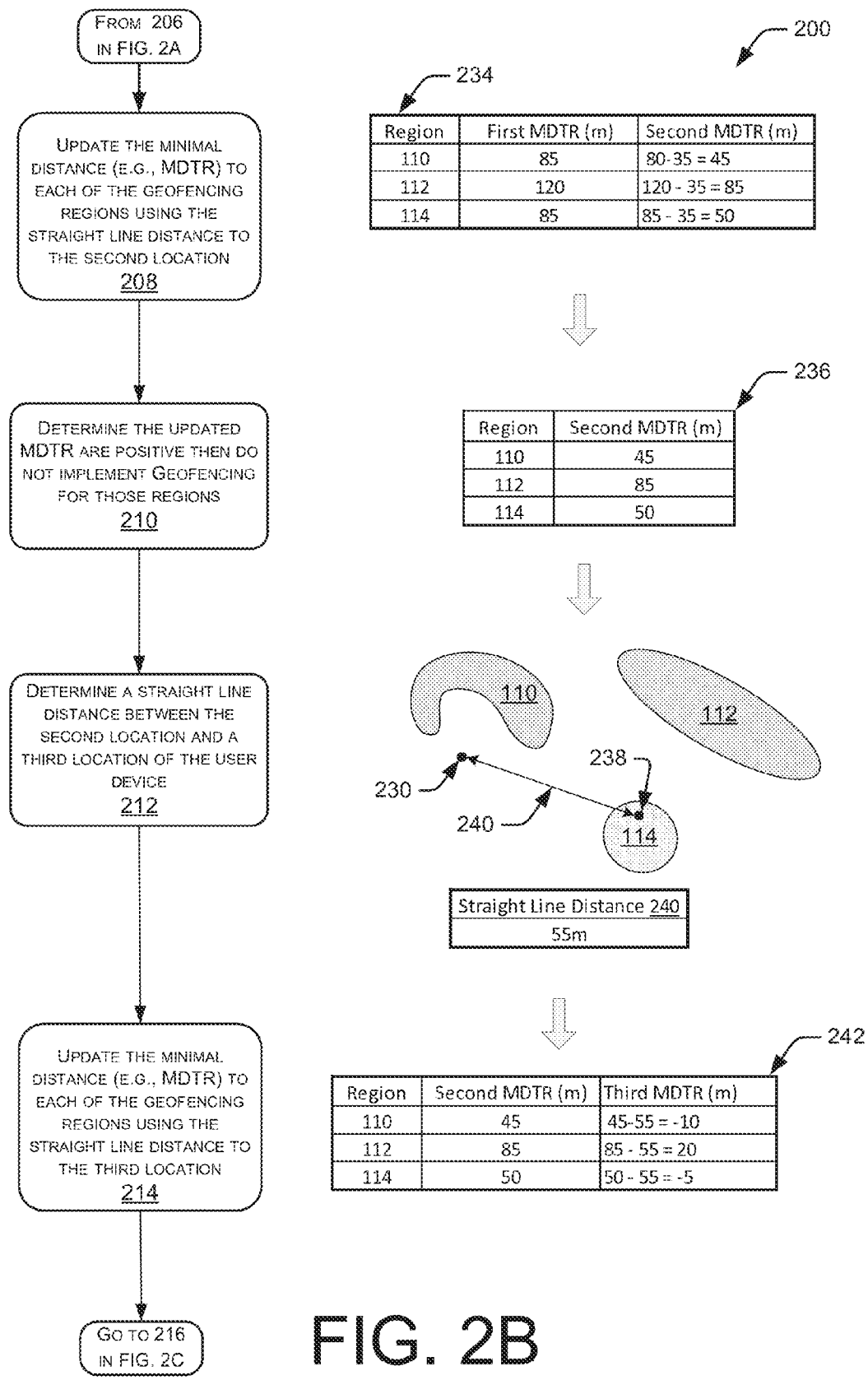
Figure 2C:
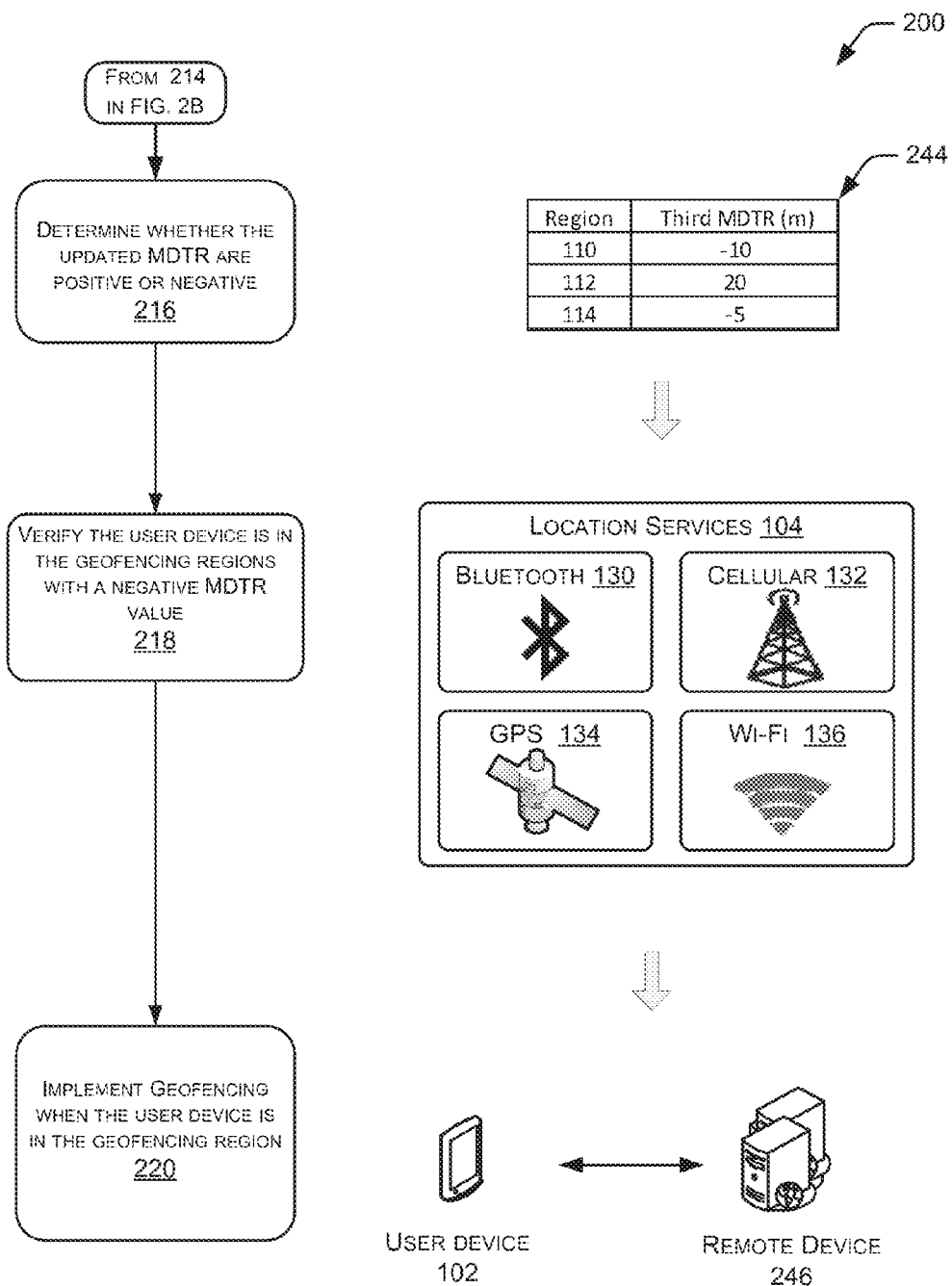

FIGS. 2A-2C illustrates a flow diagram with accompanying illustrations of a method 200 for determining the likelihood that the user device is within a geographic region in accordance with one or more embodiments of the disclosure.

At block 202, the user device 102 may determine a first location 108 of the user device 102 and a location of one or more geofencing regions 110, 112, 114. The geofencing regions 110, 112, 114 may define an area that enables a user device 102 to receive/send information that may be related to the area. For example, the information may include, but is not limited to, stores or businesses within the region (e.g., region 110) that may include advertisements, directions, or updates related to previous purchases made at the business.

The location 108 and the geofencing regions 110, 112, 114 may have coordinates or addresses that provide an indication of their relative location to each other. An example of these locations is illustrated by the schematic to the right of block 202.

At block 204, the user device 102 may determine a minimal distance to region (MDTR) to each of the geofencing regions 110, 112, 114. The user device 102 may determine the nearest coordinate or location or the nearest known coordinate or location associated with the region (e.g., region 110). The nearest coordinate may be located along the perimeter of the region that is closets to the location 108. IN this embodiment, the MDTR for region 110 is the distance 222 which is the straight line distance or horizontal distance between the location and the nearest point of the perimeter of region 110. However, in other embodiments, the nearest known coordinate may slightly farther away than the nearest coordinate. For example, the nearest known coordinate may be on the perimeter of the region 110, but is not necessarily the closest point of the region to the location 108. In certain instances, the known location coordinates may not have the resolution for each individual point of the region 110. In certain instances, the known coordinate may be located within the perimeter of the region 110.

In this embodiment, the user device 102 may determine the MDTR for region 112 to a distance 224 and the MDTR for region 114 to be a distance 226. For purposes of illustration, the MDTRs for each region may be 85 m, 120 m, and 85 m as shown in the MDTR table 228.

As noted above, the MDTR may be a straight line distance between the location 108 and each of the regions 110, 112, 114. In certain instances, the MDTR may be the horizontal distance that may not include elevation differences between the locations.

At block 206, the user device 102 may determine a straight line distance 232 between the first location 108 and a second location 230 of the user device 102. The change in location may reflect that a user has moved from the first location and the second location and may need to determine the likelihood that the user device 102 is within one of the regions 110, 112, 114. In other embodiments, the straight line distance 232 may be referred to at the gap distance or the gap between the first location 108 and the second location 230. As shown in FIG. 2A, the straight line distance may be 35 m.

At block 208, the user device 102 may update the MDTRs for each of the geofencing regions 110, 112, 114 by taking the difference between the MDTR and the straight line distance 232 to the second location. The updated MDTR table 234 illustrates the first MDTR and the second MDTR that is generated by subtracting the magnitude of the straightline distance 232 from the first MDTR for each region. The second MDTR values are as follows: region 110: 45 m, region 112: 85, region 114: 50 m.

At block 210, the user device 102 may determine the updated MDTRs are greater than zero or a positive value as shown the second MDTR table 238. The positive values indicate that the user device 102 may not have travelled far enough to enter into one of the regions 110, 112, 114. In this instance, the user device 102 may not implement geofencing protocols to confirm the location of the user device 102 is within one of the regions 110, 112, 114. The user device 102 may not also attempt to communicate with remote devices (not shown) that may have information related to one or more of the regions 110, 112, 114.

At block 212, the user device 102 may move to a third location 238 from the second location 230. Accordingly, the user device 102 may determine a straight line distance 240 between the second location 230 and the third location 240. In one embodiment, the straight line distance 240 may be 55 m.

At block 214, the user device 102 may update the MDTR for each of the geofencing regions 110, 112, 114 using the straight line distance 240 to the third location 238. The third MDTR table 242 shows the second MDTR values and the calculation done to determine the third MDTR values. In this embodiment, the third straight line distance 240 may be subtracted from the second MDTR values.

At block 216, the user device may determine whether the third MDTR values are positive or negative. As shown in the third MDTR table 244, two of the regions 110, 114 have negative values and the region 112 has a positive value. In this instance, the user device has a stronger likelihood of being in region 110 and region 114 than being in region 112. In this case, the negative values may indicate the user device 102 location has exceeded a threshold condition that enable the user device 102 to confirm its location since it's unlikely that the user device 102 is within both regions 110, 114 at the same time.

At block 218, the user device 102 may verify the location user device 102 using one or more of the locations services 104 when the MDTR values indicate a strong likelihood that the user device 102 is within one or more regions 110, 112, 114. The user device 102 may query the location services 104 or enable the network interfaces (e.g., wireless system) to receive information from the location services 104. The user device 102 may confirm that the location 238 is within region 114 and not within region 110 by using a geo-fencing function that may use the location services 104 information.

At block 220, the user device may implement or enable geofencing protocols or communications when the user device is confirmed to be within at least one of geofencing region 114. In this embodiment, the user device 102 may receive information from a remote device 246 that may include information related to the geofencing region 114. In one embodiment, the user device 102 may communicate with the remote device 246 using a wireless network. The remote device may include a computer processor, memory, and network communication components to send and receive information to/from the user device 102.

Figure 3:
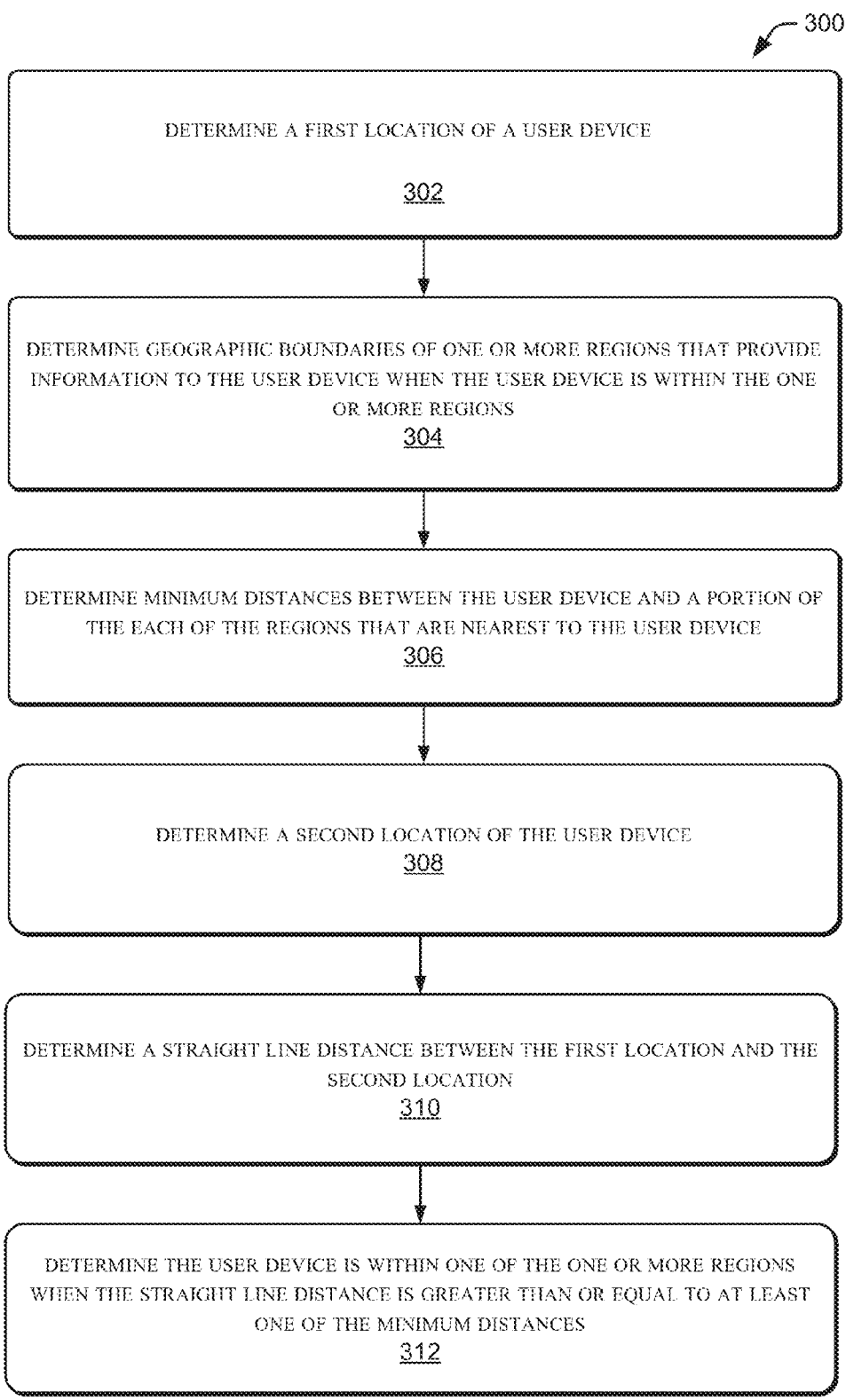
FIG. 3 illustrates a flow diagram of another method for determining the likelihood that the user device is within a geographic region in accordance with one or more embodiments of the disclosure.

FIG. 3 illustrates a flow diagram of a method 300 for determining the likelihood that the user device 102 is within a geographic region 110, 112, 114 when the user device 102 changes locations. For example, when the user device 102 changes from a first location 108 to second location 230 or from the second location 230 to a third location 238. The location determination may be based on tracking the absolute distances of the user device 102 with regard to a minimum distance to the one or more regions 110, 112, 114. Although method 300 is shown to include the following steps, the steps may be rearranged or omitted in other embodiments.

At block 302, the user device 102 may determine a first location 108 of the user device 102. The first location 108 may be selected at any time in which the user may want to implement the method 300. The first location 108 may reflect any location that may be used as the starting point for the method 300.

At block 304, the user device 102 may determine geographic boundaries of one or more regions 110, 112, 114 that may provide information to the user device 102 when the user device 102 is located within at least one of the regions 110, 112, 114. The geographic boundaries or coordinates may be provided to the user device 102 via a remote device 246 that stores information related to the one or more regions 110, 112, 114. The geographic boundaries of the regions may comprise a perimeter around a designated area. The designated area may include, but is not limited to, a building, a neighborhood, a park, a school, a geographic area (e.g., a portion of a county, a city, and/or a roadway), a public transportation route, and/or a delivery area for a business.

At block 306, the user device 102 may determine the minimum distances between the user device 203 and a portion of the each of the regions 110, 112, 114 that may be nearest to the user device 102. As noted above in the description of FIG. 1, the minimum distance may be calculated based on the area covered by the region or by known coordinates along the perimeter of the region (e.g., regions 110 or within the region (e.g., region 110).

In one embodiment, the minimum distance may include the absolute distance between the first location and a portion of each region (e.g., regions 110, 112, 114) that is nearest to the first location independent of orientation or elevation differences between the first location and each portion of the regions 110, 112, 114.

At block 308, the user device 102 may determine a second location 230 of the user device 102 when the user device moves from the first location 108. The second location 230 may be determined by an accelerometer within the user device 102 that may determine how far the user device 102 has moved. In another instance, the user device 102 may use a location service 104 to determine the second location 230.

At block 310, the user device 102 may determine a straight line distance 232 between the first location 108 and the second location 230. In one embodiment, the straight line distance 232 may include an absolute distance that is independent of orientation or elevation differences between the first location 108 and the second location 230.

At block 312, the user device 102 may determine the user device 102 may be within one of the one or more regions 110, 112, 114 when the straight line distance 232 is greater than or equal to at least one of the minimum distances 228. In order to confirm the user device 102 is within the one or more regions 110, 112, 114 the user device may implement a geo-fencing function.

In one embodiment, the user device 102 may confirm the second location of the user device is within one or more of the regions 110, 112, 114 using the location services 104 when the straight line distance 232 is greater than or equal to one of the minimum distances 228.

The user device 102 may receive information from a remote device 246 that provides information related to the region (e.g., region 110) when the user device 102 is confirmed to be located within that region (e.g., region 110).

In another embodiment, when the user device 102 is determined not to be within one of the regions 110, 112, 114 the user device may be moved to a third location. In this case, the user device 102 may attempt to determine whether the third location 238 is within one of the regions 110, 112, 114.

This may include determining another straight line distance 240 between the second location 230 and the third location 238 and determining updated minimum distances 242 for the regions 110, 112, 114 by subtracting the other straight line distance 240 from each of the minimum distances 236. The user device 102 may compare the third location 238 with at least one of the geographic boundaries of the regions 110, 112, 114 when the other straight line distance 240 is greater than or equal to at least one of the updated minimum distances 242. Again, the likelihood the user device 102 is high when the straight line distance 240 is greater than the minimum distances 242 and the likelihood is low when the straight line distance 240 is less than the minimum distances 242.

Figure 4:
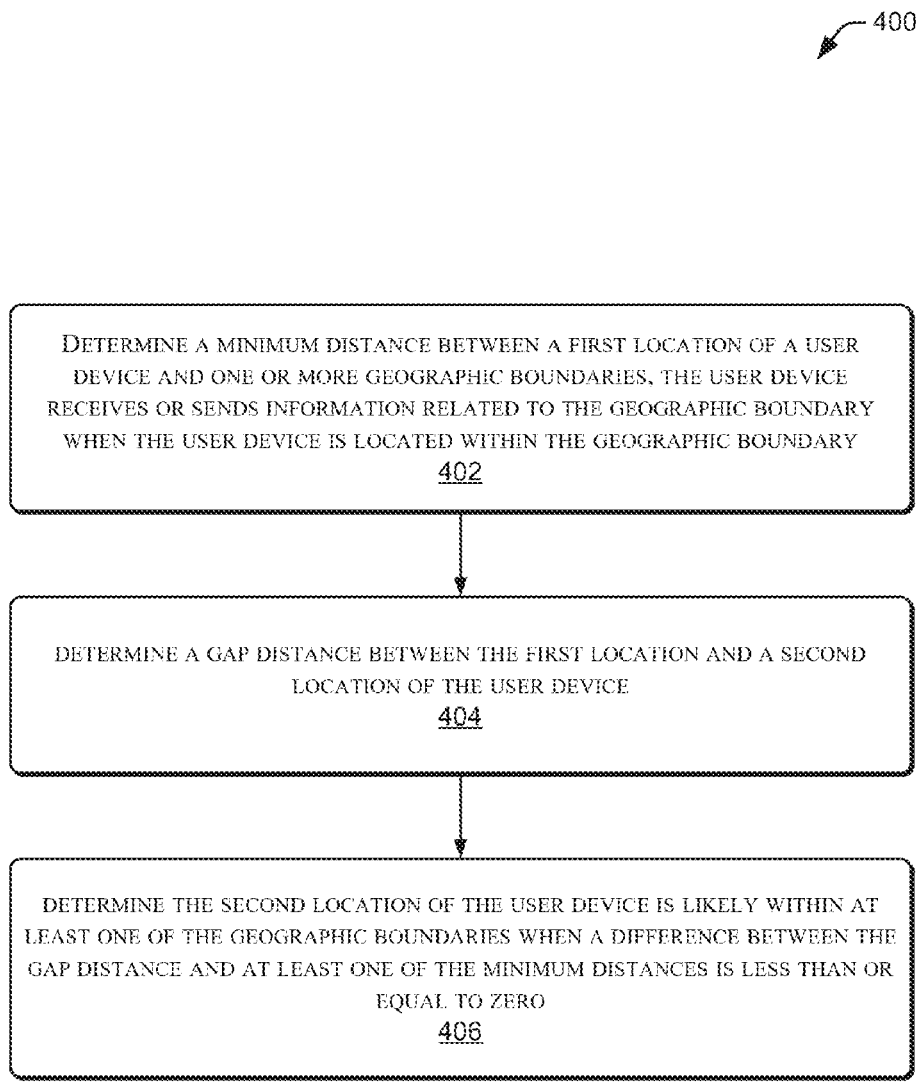
FIG. 4 illustrates a flow diagram of another method for determining the likelihood that the user device is within a geographic region in accordance with one or more embodiments of the disclosure.

FIG. 4 illustrates a flow diagram of a method 400 for determining the likelihood that the user device 102 is within a geographic region 110, 112, 114 when the user device 102 changes locations. For example, when the user device 102 changes from a first location 108 to second location 230 or from the second location 230 to a third location 238. The location determination may be based on tracking the absolute distances of the user device 102 with regard to a minimum distance to the one or more regions 110, 112, 114. Although method 400 is shown to include the following steps, the steps may be rearranged or omitted in other embodiments.

At block 402, the user device 102 may determine a minimum distance between a first location of a user device and one or more geographic boundaries (e.g., regions 110, 112, 114). The user device 102 may receive or send information related to the geographic boundary when the user device 102 is located within the geographic boundary.

In one embodiment, each of the minimum distances may comprise a horizontal distance between the first location 108 and each of the nearest points of the one or more geographic boundaries. The horizontal distance may not include a vertical distance component between the first location 108 and the second location 230.

At block 404, the user device 102 may determine a gap distance 232 between the first location 108 and a second location 230 of the user device 102. The gap distance 232 may comprise a horizontal distance between the first location 108 and the second location 230.

At block 406, the user device 102 may determine the second location 230 of the user device 230 may likely be within at least one of the geographic boundaries when the gap distance is greater than or equal to at least one of the minimum distances. In this instance, the user device 102 may implement the geo-fencing function to confirm whether the user device 102 is within one of the geographic boundaries.

When the gap distance is greater than one of the minimum distances, the user device 102 may confirm the second location is within at least one of the geographic boundaries. When the locations of user device 102 may be confirmed to be within one of the geographic boundaries, the user device 102 may receive or send information that has been assigned to the at least one geographic boundary.

In another embodiment, the user device may confirm the second location is outside at least one of the geographic boundaries when the second location is likely within the at least one geographic boundary. In this case, the user device 102 may determine the updated minimum distances between the second location 230 and the one or more geographic boundaries. The user device may be moved to a third location 238 and may determine another gap distance 240 between the second location 230 and the third location 238.

In another embodiment, the user device 102 may be a part of a system comprising at least one memory that stores computer-executable instructions and at least one processor that executes the computer-executable instructions. The computer executable instructions may enable the user device associated with the system to determine a first location of a user device, determine geographic boundaries of one or more regions that provide information to the user device when the user device is within the one or more regions, determine minimum distances between the user device and a portion of the one or more of the regions, determine a second location of the user device, determine a distance between the first location and the second location, and/or determine the user device is within one of the one or more regions when the distance between the first location and the second location meets a predetermined criteria with reference to the minimum distances and the distance between the first location and the second location.

This embodiment may also further comprise computer-executable instructions to determine a third location of the user device, determine a distance between the second location and the third location, determine updated minimum distances for the one or more regions by subtracting the distance between the second location and the third location from each of the minimum distances, compare the third location of the user device with at least one of the geographic boundaries of the regions when the distance between the second location and the third location meets a predetermined criteria with reference to the minimum distances and the distance between the second location and the third location.

The system may further comprise computer-executable instructions to confirm the second location of the user device is within at least one of the regions and receive information from a remote device that provides information related to the at least one region when the user device is confirmed to be located within the at least one region.

In this embodiment, the distance between the first location and the second location comprises an absolute distance that is independent of orientation or elevation differences between the first location and the second location. In addition, the geographic boundaries of the regions comprise a perimeter around a designated area, and when the user device is determined to be located within the perimeter the user device is permitted to send or receive information related to the designated area and is not permitted to send or receive information when the user device is determined to be located outside the perimeter. Further, the minimum distance may comprise the absolute distance between the first location and a portion of each of the one or more regions, the absolute distance being independent of orientation or elevation differences between the first location and each of the one or more portions.

The system may also comprise one or more wireless network devices to receive location information from at least one or more of the following: a cellular network, a satellite network, an access point network, or a personal area network.

In another embodiment, one or more tangible computer-readable non-transitory storage media comprising computer-executable instructions operable to, when executed by at least one computer processor, enable the at least one computer processor to implement a method comprising: determining, using the at least one computer processor, a minimum distance between a first location of a user device and one or more geographic boundaries, the user device receives or sends information related to the geographic boundary when the user device is located within the geographic boundary; determining a gap distance between the first location and a second location of the user device; and/or determining the second location of the user device is likely within at least one of the geographic boundaries when the gap distance is greater than or equal to at least one of the minimum distances.

This embodiment may further include computer-readable instructions to confirm the second location is outside at least one of the geographic boundaries when the second location is likely within the at least one geographic boundary and determine updated minimum distances between the second location and the one or more geographic boundaries, determine another gap distance between the second location and a third location of the user device; determine the second location of the user device is likely within at least one of the geographic boundaries when a difference between the other gap distance and at least one of the updated minimum distances is less than or equal to zero; confirm the third location is within at least one of the geographic boundaries when the third location is likely within the at least one geographic boundary; and/or receive or send information assigned to the at least one geographic boundary when the user device is confirmed to be located within the at least one geographic boundary.

This embodiment may further include computer-readable instructions to confirm the second location is within at least one of the geographic boundaries when the second location is likely within the at least one geographic boundary and receive or send information assigned to the at least one geographic boundary when the second location is confirmed to be within the at least one geographic boundary.

In one embodiment, the gap distance comprises a horizontal distance between the first location and the second location and each of the minimum distances comprise a horizontal distance between the first location and at least one of the one or more geographic boundaries to the first location. The gap distance of each of the minimum distances are determined independent of the orientation between the first location, second location, or the one or more geographic boundaries. Further, the gap distance and the minimum distances are determined based, at least in part, on information from one or more of the following: on a cellular network, a satellite network, a personal area network, or an access point network.

In another embodiment, a device may be used to execute the computer-executable instructions described in the embodiment above.

In another embodiment a method comprises determining a minimum distance between a first location of a user device and one or more geographic boundaries, wherein the user device receives or sends information related to the geographic boundary when the user device is located within the geographic boundary, determining a gap distance between the first location and a second location of the user device, and determining the second location of the user device is likely within at least one of the geographic boundaries when the gap distance is greater than or equal to at least one of the minimum distances.

The method may further comprise confirming the second location is within at least one of the geographic boundaries when the second location is likely within the at least one geographic boundary, and receiving or sending information assigned to the at least one geographic boundary when the second location is confirmed to be within the at least one geographic boundary.

In an alternative embodiment, the method may further comprise confirming the second location is outside at least one of the geographic boundaries when the second location is likely within the at least one geographic boundary, determining updated minimum distances between the second location and the one or more geographic boundaries; determining another gap distance between the second location and a third location of the user device, determining the second location of the user device is likely within at least one of the geographic boundaries when a difference between the other gap distance and at least one of the updated minimum distances is less than or equal to zero, confirming the third location is within at least one of the geographic boundaries when the third location is likely within the at least one geographic boundary, and receiving or sending information assigned to the at least one geographic boundary when the user device is confirmed to be located within the at least one geographic boundary.

CONCLUSION

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions, which have been employed herein, are used as terms of description and not of limitation. In the use of such terms and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the disclosure, including the best mode, and to enable any person skilled in the art to practice certain embodiments of the disclosure, including making and using any devices or systems and performing any incorporated methods. The patentable scope of certain embodiments of the disclosure is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A system, comprising:
   at least one memory that stores computer-executable instructions; and
   at least one processor that executes the computer-executable instructions to:
   determine a first location of a user device associated with the system;
   determine geographic boundaries of one or more regions;
   determine minimum distances between the user device and a portion of the one or more of the regions;
   determine a second location of the user device;
   determine a distance between the first location and the second location; and
   determine the user device is within one of the one or more regions when the distance between the first location and the second location meets a predetermined criteria with reference to the minimum distances and the distance between the first location and the second location.

2. The system of claim 1, further comprising computer-executable instructions to:
   confirm the second location of the user device is within at least one of the regions; and
   receive information from a remote device related to the at least one of the regions after confirming.

3. The system of claim 1, further comprising computer-executable instructions to:
   determine a third location of the user device;
   determine a distance between the second location and the third location;
   determine updated minimum distances for the one or more regions by subtracting the distance between the second location and the third location from each of the minimum distances; and
   compare the third location of the user device with at least one of the geographic boundaries of the regions when the distance between the second location and the third location meets a predetermined criteria with reference to the minimum distances and the distance between the second location and the third location.

4. The system of claim 1, wherein the distance between the first location and the second location comprises an absolute distance that is independent of orientation or elevation differences between the first location and the second location.

5. The system of claim 1, wherein the geographic boundaries of the regions comprise a perimeter around a designated area, and when the user device is determined to be located within the perimeter the user device is permitted to send or receive information related to the designated area, and is not permitted to send or receive information when the user device is determined to be located outside the perimeter.

6. The system of claim 1, wherein the minimum distance comprises the absolute distance between the first location and a portion of each of the one or more regions, the absolute distance being independent of orientation or elevation differences between the first location and each of the one or more portions.

7. The system of claim 1, further comprising one or more wireless network devices to receive location information from at least one or more of the following: a cellular network, a satellite network, an access point network, or a personal area network.

8. One or more tangible computer-readable non-transitory storage media comprising computer-executable instructions operable to, when executed by at least one computer processor, enable the at least one computer processor to implement a method comprising:
   determining, using the at least one computer processor, a minimum distance between a first location of a user device and one or more geographic boundaries, the user device receives or sends information related to the geographic boundary when the user device is located within the geographic boundary;
   determining a gap distance between the first location and a second location of the user device; and
   determining the second location of the user device is likely within at least one of the geographic boundaries when the gap distance is greater than or equal to at least one of the minimum distances.

9. The one or more tangible computer-readable non-transitory storage media of claim 8, further comprising:
   confirming the second location is within at least one of the geographic boundaries when the second location is likely within the at least one geographic boundary; and receiving or sending information assigned to the at least one geographic boundary when the second location is confirmed to be within the at least one geographic boundary.

10. The one or more tangible computer-readable non-transitory storage media of claim 8, further comprising:
confirming the second location is outside at least one of the geographic boundaries when the second location is likely within the at least one geographic boundary; and
determining updated minimum distances between the second location and the one or more geographic boundaries;
determining another gap distance between the second location and a third location of the user device;
determining the second location of the user device is likely within at least one of the geographic boundaries when a difference between the other gap distance and at least one of the updated minimum distances is less than or equal to zero;
confirming the third location is within at least one of the geographic boundaries when the third location is likely within the at least one geographic boundary; and
receiving or sending information assigned to the at least one geographic boundary when the user device is confirmed to be located within the at least one geographic boundary.

11. The one or more tangible computer-readable non-transitory storage media of claim 8, wherein the gap distance comprises a horizontal distance between the first location and the second location.

12. The one or more tangible computer-readable non-transitory storage media of claim 8, wherein each of the minimum distances comprise a horizontal distance between the first location and at least one of the one or more geographic boundaries to the first location.

13. The one or more tangible computer-readable non-transitory storage media of claim 8, wherein the gap distance of each of the minimum distances are determined independent of the orientation between the first location, second location, or the one or more geographic boundaries.

14. The one or more tangible computer-readable non-transitory storage media of claim 8, wherein the gap distance and the minimum distances are determined based, at least in part, on information from one or more of the following: on a cellular network, a satellite network, a personal area network, or an access point network.

15. A device, comprising:
at least one radio;
one or more antennas;
at least one memory that stores computer-executable instructions; and
at least one computer processor that executes the computer-executable instructions to:
determine, using the at least one computer processor, a minimum distance between a first location of a user device and one or more geographic boundaries, the user device receives or sends information related to the geographic boundary when the user device is located within the geographic boundary;
determine a gap distance between the first location and a second location of the user device; and
determine the second location of the user device is likely within at least one of the geographic boundaries when a difference between the gap distance and at least one of the minimum distances is less than or equal to zero.

16. The device of claim 15, further comprising computer-executable instructions to:
confirm the second location is within at least one of the geographic boundaries when the second location is likely within the at least one geographic boundary; and
receive or sending information assigned to the at least one geographic boundary when the second location is confirmed to be within the at least one geographic boundary.

17. The device of claim 15, further comprising computer-executable instructions to:
confirm the second location is outside at least one of the geographic boundaries when the second location is likely within the at least one geographic boundary; and
determine updated minimum distances between the second location and the one or more geographic boundaries;
determine another gap distance between the second location and a third location of the user device; and
determine the second location of the user device is likely within at least one of the geographic boundaries when a difference between the other gap distance and at least one of the updated minimum distances is less than or equal to zero;
confirm the third location is within at least one of the geographic boundaries when the third location is likely within the at least one geographic boundary; and
receive or sending information assigned to the at least one geographic boundary when the user device is confirmed to be located within the at least one geographic boundary.

18. The device of claim 15, wherein the gap distance comprises a horizontal distance between the first location and the second location.

19. The device of claim 15, wherein each of the minimum distances comprise a horizontal distance between the first location and each of the nearest points of the one or more geographic boundaries to the first location.

20. The device of claim 15, wherein the gap distance the each of the minimum distances are determined independent of the orientation between the first location, second location or geographic boundaries.

21. A method, comprising:
determining, using the at least one computer processor, a minimum distance between a first location of a user device and one or more geographic boundaries, the user device receives or sends information related to the geographic boundary when the user device is located within the geographic boundary;
determining a gap distance between the first location and a second location of the user device; and
determining the second location of the user device is likely within at least one of the geographic boundaries when the gap distance is greater than or equal to at least one of the minimum distances.

22. The method of claim 21, further comprising:
confirming the second location is within at least one of the geographic boundaries when the second location is likely within the at least one geographic boundary; and
receiving or sending information assigned to the at least one geographic boundary when the second location is confirmed to be within the at least one geographic boundary.

23. The method of claim 21, further comprising:
confirming the second location is outside at least one of the geographic boundaries when the second location is likely within the at least one geographic boundary; and
determining updated minimum distances between the second location and the one or more geographic boundaries;

determining another gap distance between the second location and a third location of the user device;

determining the second location of the user device is likely within at least one of the geographic boundaries when a difference between the other gap distance and at least one of the updated minimum distances is less than or equal to zero;

confirming the third location is within at least one of the geographic boundaries when the third location is likely within the at least one geographic boundary; and receiving or sending information assigned to the at least one geographic boundary when the user device is confirmed to be located within the at least one geographic boundary.

* * * * *